Feb. 19, 1929.

F. B. JOHNSTON 1,702,509

SCAFFOLDING

Filed Feb. 24, 1927   2 Sheets-Sheet 1

Inventor
F. B. Johnston,
by C. P. Goepel
Attorney

Feb. 19, 1929.  1,702,509
F. B. JOHNSTON
SCAFFOLDING
Filed Feb. 24, 1927   2 Sheets-Sheet 2

Inventor
F. B. Johnston,
by C. P. Goepel
Attorney

Patented Feb. 19, 1929.

1,702,509

UNITED STATES PATENT OFFICE.

FRANK B. JOHNSTON, OF ROSELLE PARK, NEW JERSEY, ASSIGNOR TO AMERICAN SAFETY DEVICE COMPANY, OF NEW YORK, N. Y., A CORPORATION OF NEW YORK.

SCAFFOLDING.

Application filed February 24, 1927. Serial No. 170,541.

The present invention relates to scaffolding and more particularly to an improved hoisting and lowering device by means of which the entire scaffolding may be raised and lowered simultaneously and evenly.

An object of this invention is to provide an improved hoisting means which embodies a plurality of independent hoisting drums carrying cables adapted for connection with the scaffolding at different points, and to provide a common drive or operating means for simultaneously and equally turning all of the drums to raise and lower the scaffolding evenly at all points and by the use of a single motor or driving unit.

Another object of the invention is to provide a plurality of separate hoisting devices which are capable of being mounted upon the adjustable platform or upon the outriggers and which, in either position, may be connected together for simultaneous and equal operation so that the scaffolding may be controlled from a fixed point to evenly raise and lower the platform or may be controlled from the platform itself for evenly and simultaneously raising and lowering all parts of the platform.

Another object of the invention is to provide a common drive means for a number of hoisting devices which is so constructed and arranged as to occupy but relatively small space and not be in the way of those working on the platform, and to provide a device which is positive in action and which may be operated from one motor to actuate all of the hoisting devices connected to it.

With the foregoing and other objects in view, the invention will be more fully described hereinafter, and will be more particularly pointed out in the claims appended hereto.

In the drawings, wherein like symbols refer to like or corresponding parts throughout the several views:—

Figure 1:
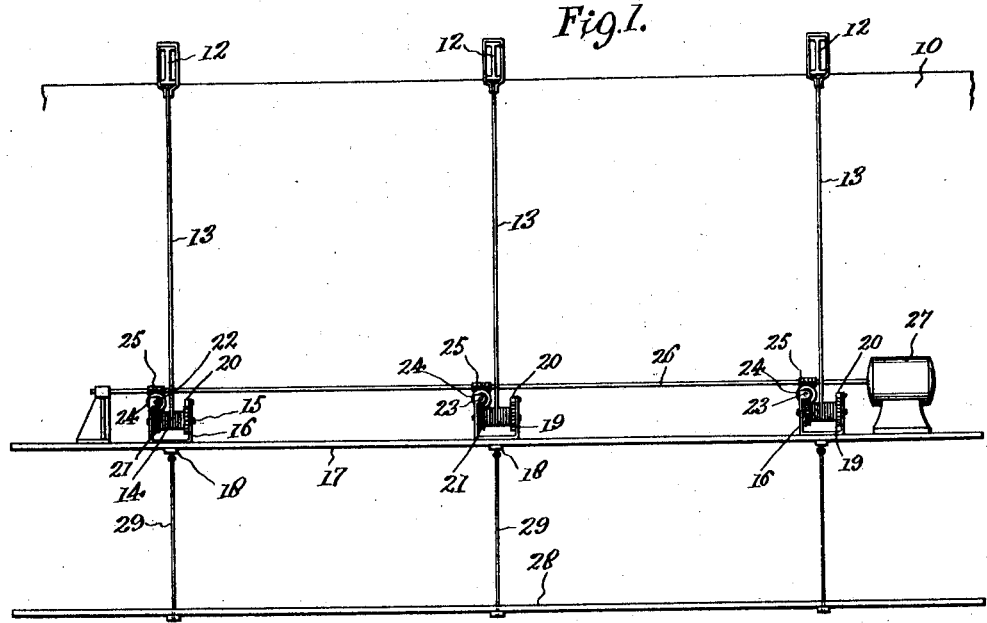
Figure 1 is a front elevation of a scaffolding constructed according to the present invention, and showing the improved hoisting means applied thereto.

Referring to the drawings, 10 designates a wall of a building which may have a roof or flooring 11, and upon which rest a number of outriggers 12 which project forwardly beyond the wall 10 to support the scaffolding which is suspended beneath the outriggers.

Figure 3:
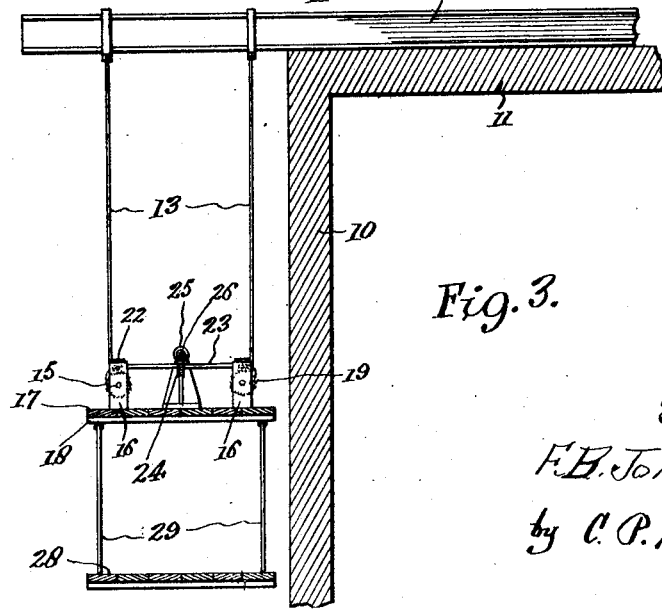
Figure 3 is an end elevation of the scaffolding as applied to a building, the wall and roof of the latter shown in section.

In the present instance three outriggers are shown, and from each outrigger there is suspended a pair of cables 13. The cables 13 at their lower ends are wound each upon a drum 14 and the drum is mounted to turn upon a shaft 15 carried in a substantially rectangular frame 16. The frame 16 is secured to the platform 17 of the scaffolding, the platform being composed of a plurality of lengthwise extending boards arranged in edge to edge relation and secured across the upper side of a putlog 18 or the like. As shown in Figures 1 and 3, the putlogs 18 may be three in number, one disposed beneath each pair of frames 16 so that the frames may be securely fastened to the platform 17 by bolts or the like which pass downwardly through the boards and through the putlogs. One arrangement of the frames 16 upon the platform 17 is to dispose the outer frames 16 with their drums 14 in a longitudinal row near the outer edge of the platform 17 and with the longitudinal axes of the drums 14 alining.

Figure 2:
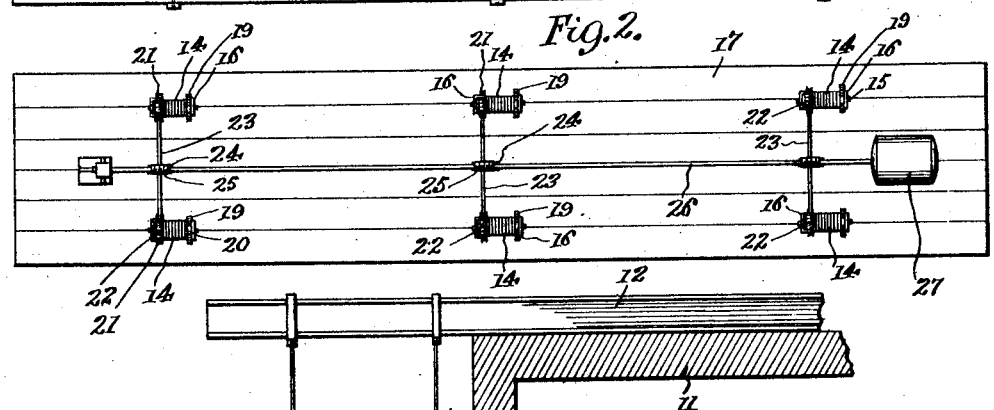
Figure 2 is a top plan view of the same.
Figure 4:
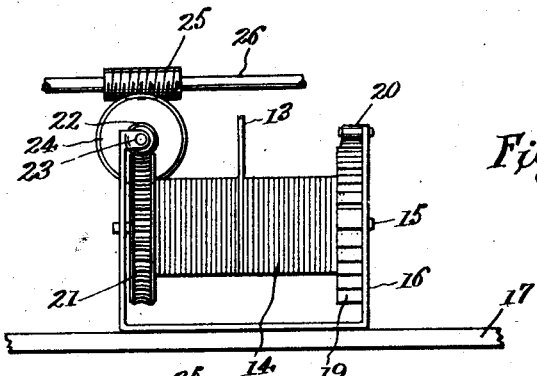
Figure 4 is a detailed enlarged side elevation of one of the hoisting drums and its adjacent parts.

The rear frames 16 are disposed in a similar manner but near the rear edge of the platform 17 and in transverse alinement with the frames and drums at the forward edge of the platform. The drums 14 and their mechanism are thus disposed in spaced apart pairs at spaced apart sections or portions throughout the length of the platform 17. Each drum 14, as shown in Figure 4, is provided at one end with a ratchet wheel 19 with which engages at ratchet 20 carried by the frame 16 for holding the drum 14 against turning backwardly to release the cable 13 after the adjustment has been made. The other end of the drum 14 is preferably provided with a worm gear wheel 21 with which meshes a worm 22 carried on a shaft 23, which is journaled in the upper end of the frame 16 above the worm wheel 21. This shaft 23 extends across the platform so as to inter-connect the adjacent pair of drums 14, and the worms 22 and other parts of the driven mechanism are proportioned and threaded so as to cause the simultaneous and equal turning of each pair of the drums 14. The shaft 23 is provided at an intermediate point with a worm wheel 24, which meshes with a second worm 25 carried upon a longitudinally and centrally extending shaft 26. Each pair of drums 14 is provided with a transverse shaft 23 and the worm wheels 24 and worms 25, the shaft 26 carrying the worms 25, as shown in Figure 2, so as to operate all of the worms 25 when the shaft 26 is rotated. Thus the drums 14 are turned simultaneously and equally not only in pairs, but also in multiple according to the number of pairs which are connected to the shaft 26. This insures the even raising and lowering of all portions of the platform 17 by the operation of but the single shaft 26. The shaft 26 may be driven in any suitable manner, such as by a motor 27 of electrical type. Of course, any other suitable driving connections may be employed for the shaft 26, and a flexible shaft connection may be carried off from the shaft 26 to any desirable point at which it is desired to locate the driving element.

In the present instance the platform 17 is disclosed as having a second platform 28 suspended therefrom by links 29 or the like so that the scaffolding may have the upper and lower platforms in the desired relative adjustment at all times.

Figure 5:
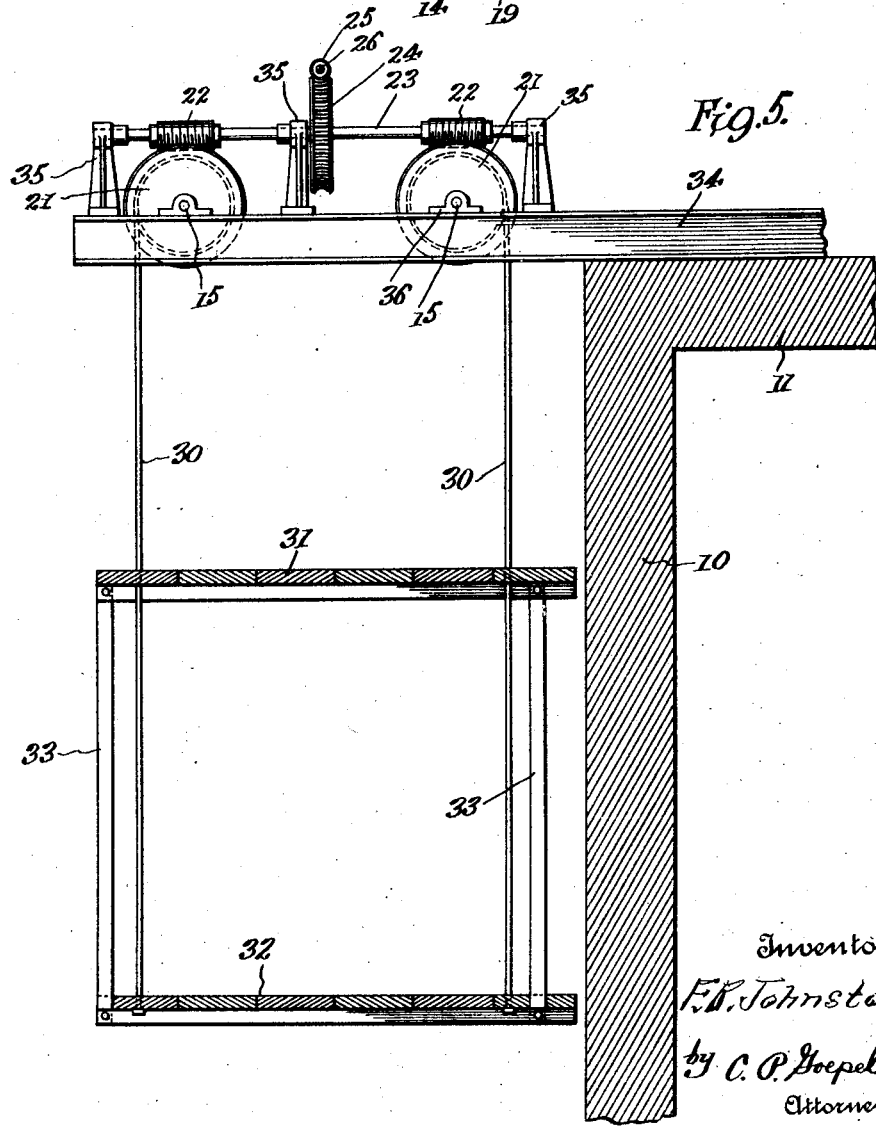
Figure 5 is an enlarged end elevation of a slightly modified arrangement of the hoisting means applied to the outriggers instead of to the platform, as shown in Figures 1, 2 and 3.

In Figure 5 the slight modification shows the depending cables 30 secured to the platforms 31 and 32 which are interconnected by the links 33, the cables 30 extending upwardly to the outriggers 34 upon which the drums 14 and their associated parts are mounted. The structure and arrangement of the drums is identical to that above described in connection with Figures 1 to 4 with the exception that the frames 16 are omitted and the transverse shafts 23 are mounted at opposite ends in bearing posts 35 which are carried by the outriggers 34, and the shafts 15 of the drums are mounted in bearings 36 also mounted on the outriggers.

It is thus apparent that the mechanism may be applied either to the vertically adjustable platform itself, or may be applied to the supporting outriggers so as to uniformly and evenly raise and lower all sections of the platform, and wherein the entire mechanism is driven from a single motor.

I have illustrated and described a preferred and satisfactory embodiment of my invention, but it is obvious that changes may be made therein within the spirit and scope thereof as defined in the appended claims.

What is claimed is:—

1. In scaffolding, a movable platform, a plurality of hoisting drums arranged in transverse pairs spaced throughout the length of the platform and secured thereto, ratchet means connected to said drums for holding the same from turning in a reverse direction, driving means connected to the drums for turning the same, cables on the drums, outriggers for supporting the upper ends of the cables, a transverse shaft for each pair of drums and connected to the turning means thereof, a worm wheel on each transverse shaft at a point between the drums of each pair, a single operating motor, a shaft leading from said motor and disposed centrally over the platform and mounted thereon, and gears carried by the shaft one for each transverse shaft and intermeshing with the gear wheels thereof for simultaneously turning the transverse shafts and the drums by the single motor.

2. In scaffolding, a movable platform, a plurality of outriggers for supporting the platform, pairs of cables secured to each outrigger and extending downwardly toward the platform, pairs of drums secured upon the platform at spaced portions throughout the length of the platform and about which the lower end portions of said cables are wound, ratchet means for locking the drums against unwinding, a transverse shaft for each pair of drums, worm drive means between each drum and the adjacent end of the transverse shaft, a worm wheel carried intermediately upon the transverse shaft, a longitudinal drive shaft mounted on the platform, a worm on said drive shaft for each worm wheel to intermesh therewith, and a single electric motor attached to the platform for said drive shaft directly connected thereto to operate the same and simultaneously and evenly turn said drums for raising and lowering the platform.

3. In scaffolding, a pair of connected movable platforms, a plurality of winding drums secured upon one of the platforms at spaced points thereof and disposed in front and rear longitudinal rows and in transverse spaced pairs, driving means for said drums to turn the same, cables wound on the drums, outriggers for supporting the upper ends of said cables and admit the lifting of the platforms by the winding of said drums, a plurality of transverse shafts one for each pair of drums and connected to the winding mechanisms of the drums, a single shaft arranged lengthwise of the platform and mounted thereon, gear connections between the single drive shaft and said transverse shafts to simultaneously and equally operate all of the drums, and an electric motor mounted on the platform for turning said drive shaft.

In testimony that I claim the foregoing as my invention, I have signed my name hereto.

FRANK B. JOHNSTON.